United States Patent [19]

Muirhead

[11] Patent Number: 4,617,463

[45] Date of Patent: Oct. 14, 1986

[54] SEGMENTED OPTICAL SYSTEM FOR AN ALARM SYSTEM

[75] Inventor: Allen D. Muirhead, Rossendale, England

[73] Assignee: Monicell Limited, Lancashire, England

[21] Appl. No.: 681,514

[22] Filed: Dec. 12, 1984

[30] Foreign Application Priority Data

Dec. 15, 1983 [GB] United Kingdom ................ 8333400

[51] Int. Cl.[4] ............................................ G01J 1/00

[52] U.S. Cl. ............................... 250/342; 250/338 R; 350/616

[58] Field of Search .......................... 250/338 R, 342; 340/567; 350/1.5, 616, 625

[56] References Cited

U.S. PATENT DOCUMENTS

| | | | |
|---|---|---|---|
| 3,703,718 | 11/1972 | Berman | 340/567 |
| 3,958,118 | 5/1976 | Schwarz | 250/221 |
| 4,263,585 | 4/1981 | Schaefer | 250/342 |
| 4,321,594 | 3/1982 | Galvin et al. | 250/342 |

FOREIGN PATENT DOCUMENTS

| | | |
|---|---|---|
| 0080114 | 6/1983 | European Pat. Off. . |
| 3039819 | 5/1982 | Fed. Rep. of Germany . |
| 629904 | 5/1982 | Switzerland . |
| 2064108 | 6/1981 | United Kingdom . |
| 2074314 | 10/1981 | United Kingdom . |

*Primary Examiner*—Janice A. Howell

*Attorney, Agent, or Firm*—Pravel, Gambrell, Hewitt & Kimball

[57] ABSTRACT

A segmented optical system for use in an alarm system. A plurality of optical elements such as mirrors are arranged so that each of them directs radiation from a predetermined direction towards a common focal point. Each optical element defines a respective discrete field of view to a detector at the focal point, adjacent fields of view overlapping so that an object moving from within one field of view towards an adjacent field of view enters an area which is common to the two adjacent fields of view. There is thus a stepwise change in the intensity of radiation reaching the detector from a single source when that single source crosses the boundary of a field of view and yet there is no space between adjacent fields of view from which no radiation can be received by the detector.

4 Claims, 2 Drawing Figures

SEGMENTED OPTICAL SYSTEM FOR AN ALARM SYSTEM

Figure 1:
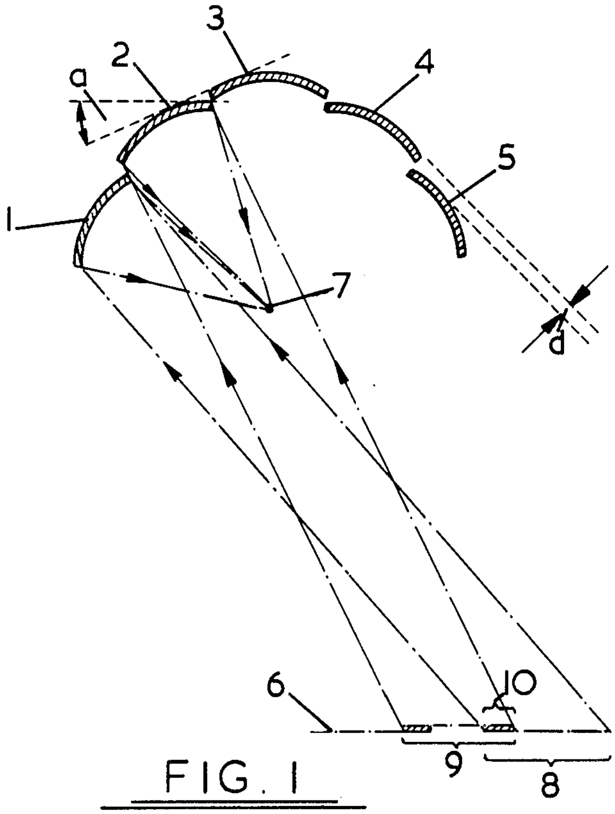

The present invention relates to a segmented optical system for an alarm system.

Infra-red intrusion alarm systems are well known. Generally such systems comprise an infra-red detector such as a thermistor bolometer the resistance of which is a function of the intensity of infra-red radiation impinging upon the detector, and an optical system such as a reflector for focussing infra-red radiation on the detector.

If a single reflector in the form of for example a part spherical mirror is used with a reasonably wide field of view it is difficult to detect the movement of an intruder within that field of view as the intensity of the infra-red radiation reflected to the detector does not vary much. Accordingly it has been proposed to provide a segmented reflector which focusses radiation from a plurality of discrete spaced apart fields of view as described in U.S. Pat. No. 3,703,718. As an intruder moves out of or into one of the discrete fields of view the intensity of the infra-red radiation reflected to the detector changes sharply, and this change can be relatively easily discriminated from changes in the intensity of infra-red radiation reflected to the detector which occur as the result of for example gradual temperature changes.

In the arrangement of U.S. Pat. No. 3,703,718 the discrete fields of view must be spaced apart sufficiently to ensure that an intruder moving from one field of view to another passes through a "blind spot". If there is no blind spot of sufficient extent to accommodate all or most of the intruder's body the intensity of radiation reflected to the detector would not change sufficiently for the change to be reliably sensed. Accordingly intruder alarm systems using segmented reflectors must be carefully set up to ensure that all critical areas such as points of entry are within one of the discrete fields of view. There is however a further problem with the known segmented reflectors as a result of their inherent blind spots. In applications where a single segmented reflector and detector assembly is to be used in a combined intruder and fire alarm system the system cannot detect flames which are not directly in one of the discrete fields of view. This is clearly a serious defect given that the early detection of the outbreak of fire is so important. A combined infra-red intruder and alarm system is described in Published European Patent Application No. 0 103 375.

It is an object of the present invention to provide a segmented optical system for an alarm system which avoids the above problems.

According to the present invention, there is provided a segmented optical system for an alarm system, comprising a plurality of optical elements each of which is arranged to direct radiation from a predetermined direction towards a common focal point whereby each optical element defines a respective discrete field of view to an observer at the focal point, wherein adjacent fields of view overlap so that an object moving from within one field of view towards an adjacent field of view enters an area which is common to the said one and the adjacent fields of view.

Preferably the optical elements are reflectors, but other optical elements such as Fresnel lenses may be used.

The provision of overlapping fields of view ensures that there are no blind spots and yet still provides a sharp change in intensity at the focal point when a source of radiation crosses the boundary of one of the discrete fields of view. It is simply necessary to provide a detector at the focal point with an associated circuit which can discriminate between the intensity of radiation received from one optical element and the intensity of radiation received from two optical elements.

Figure 2:
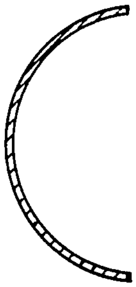

An embodiment of the present invention will now be described, by way of example, with reference to the accompanying drawings, in which:

FIG. 1 shows a section through a segmented reflector embodying the present invention; and FIG. 2 shows a section through one of the reflective surfaces of FIG. 1 on a line perpendicular to FIG. 1.

Referring to FIG. 1, the illustrated reflector comprises five segments 1, 2, 3, 4 and 5 each taken from a spherical mirror. The segments are arranged such that tangents drawn from adjacent edges of the segments define an angle a. Adjacent mirrors are displaced relative to each other by a distance d so that parallel rays from a plane 6 are reflected to a common focal point 7.

FIG. 2 shows a section taken peripendicular to the plane of FIG. 1 through any one of the segments 1 to 5.

The illustrated arrangement is such that an observer at the focal point 7 would see a series of overlapping fields of view each defined by a respective segment of the mirror. For example, segment 1 defines the field of view 8 on the plane 6 whereas segment 2 defines the field of view 9, the two fields of view overlapping in region 10. Thus a source of radiation moving on plane 6 in FIG. 1 from right to left would first enter field of view 8, then enter field of view 9 whilst sill in field of view 8, and then leave the field of view 8 whilst still in field of view 9.

In use, an infra-red detector is located at the focal point 7 and connected to circuitry responsive to sharp changes in the intensity of radiation impinging on the detector. A sharp change occurs when the source enters and leaves the region 10. Thus an effective intruder alarm can be provided without any blind spots.

The angle a is preferably selected so that the area of overlap between fields of view is approximately equal to the area in which there is no overlap.

Although reference is made to using spherical mirrors, other suitable reflecting surfaces may be used, for example parabolic segments. Furthermore, although in the described embodiment the mirror is segmented in one direction only, it may be segmented in two perpendicular directions to produce a more complex arrangement of fields of view. If this was done a section equivalent to that of FIG. 2 would show segments in addition to the segments which would be shown in a section equivalent to FIG. 1. For example, two rows of mirrow segments may be provided, one row being made up of thirteen segments each with a field of view equal to 10.5° and an overlap with adjacent fields of view equal to 3.5° to give a total field of view of 94.5°, and the other row being mae up of six elements each with a field of view equal to 21° and an overlap with adjacent fields of view equal to 7° to give a total field of view of 91°. Such an arrangement would be ideal for mounting in the corner of a room from which at least a 90° field of view is required.

It should also be appreciated that although the described embodiment comprises optical elements in the form of reflective surfaces any other suitable optical elements could be used, for example Fresnel lenses, providing they provide overlapping fields of view.

What is claimed is:

1. A segmented optical system for an alarm system, comprising a plurality of optical elements each of which is arranged to direct radiation from a predetermined direction towards a common focal point whereby each optical element defines a respective discrete field of view to an observer at the focal point, wherein adjacent fields of view overlap so that an object moving from within one field of view towards an adjacent field of view enters an area which is common to the said one and the adjacent fields of view.

2. A segmented optical system according to claim 1, wherein the optical elements are reflectors.

3. A segmented optical system according to claim 1, wherein the optical elements are Fresnel lenses.

4. A segmented optical system according to claim 1, wherein the optical elements are arranged in at least one row.

* * * * *